United States Patent

Itaya et al.

[11] Patent Number: 5,318,824
[45] Date of Patent: Jun. 7, 1994

[54] PACKAGING STRUCTURE

[75] Inventors: Kozo Itaya, Sakai; Hirotaka Nishida, Minoo; Kazutoshi Fukuda, Ichihara, all of Japan

[73] Assignees: Mitsui Petrochemical Industries, Ltd., Tokyo; Shionogi & Co. Ltd.; Taisei Kako Co., Ltd., both of Osaka, all of Japan

[21] Appl. No.: 961,056

[22] Filed: Oct. 14, 1992

Related U.S. Application Data

[60] Continuation of Ser. No. 575,849, Aug. 31, 1990, abandoned, which is a division of Ser. No. 399,391, Aug. 25, 1989, Pat. No. 4,973,375, which is a continuation of Ser. No. 44,698, May 1, 1987, abandoned.

[30] Foreign Application Priority Data

May 2, 1986 [JP] Japan .................. 61-101165
May 2, 1986 [JP] Japan .................. 61-101166

[51] Int. Cl.⁵ .................. B32B 3/12; B65D 83/04
[52] U.S. Cl. .................. 428/178; 428/172;
428/179; 428/213; 428/216; 428/516; 428/212;
206/531; 206/532; 206/538
[58] Field of Search .......... 428/174, 178, 212, 213,
428/516, 72, 119, 120, 216, 517, 519, 156, 172,
179, 141; 206/528, 529, 531, 532, 538

[56] References Cited

U.S. PATENT DOCUMENTS

| | | | |
|---|---|---|---|
| 3,462,329 | 8/1969 | Beyer | 156/190 |
| 3,878,018 | 4/1975 | Cospen et al. | 156/267 |
| 3,925,591 | 12/1975 | Breitenfellner et al. | 428/483 |
| 4,126,262 | 11/1978 | Thompson | 229/176 |
| 4,229,927 | 10/1980 | Day | 53/433 |
| 4,252,851 | 2/1981 | Lansbury | 428/349 |
| 4,322,465 | 3/1982 | Webster | 428/194 |
| 4,372,098 | 2/1983 | Mason | 53/412 |
| 4,460,631 | 7/1984 | Steigmeier | 428/335 |
| 4,574,104 | 3/1986 | Ashima | 428/220 |

FOREIGN PATENT DOCUMENTS

| | | |
|---|---|---|
| 0150979 | 7/1985 | European Pat. Off. |
| 38766 | 4/1974 | Japan . |
| 135276 | 10/1978 | Japan . |
| 26466 | 2/1984 | Japan . |
| 182714 | 10/1984 | Japan . |
| 152451 | 7/1986 | Japan . |
| 1211178 | 3/1969 | United Kingdom . |
| 1436875 | 8/1973 | United Kingdom . |
| 1590588 | 7/1977 | United Kingdom . |
| 2111908 | 7/1983 | United Kingdom . |
| 2153287 | 8/1985 | United Kingdom . |
| 2195315 | 4/1988 | United Kingdom . |

*Primary Examiner*—Donald J. Loney
*Attorney, Agent, or Firm*—Sherman and Shalloway

[57] ABSTRACT

A packaging structure composed of a composite synthetic resin sheet having a depressed portion formed therein for holding an article and a metal foil bonded to the sheet, said composite sheet being a three-layer sheet composed of an interlayer of high-density polyethylene and outside layers of a propylene polymer bonded to both surfaces of the interlayer, the interlayer having a thickness of 120 to 800 micrometers, each of the outside layers having a thickness of 15 to 80 micrometers, and the thickness of the interlayer being at least 2.5 times the total thickness of both outside layers; a process for production thereof; and a process for producing a composite (synthetic) resin sheet suitable as a material for the aforesaid packaging structure.

9 Claims, 1 Drawing Sheet

Fig. 1 (1)
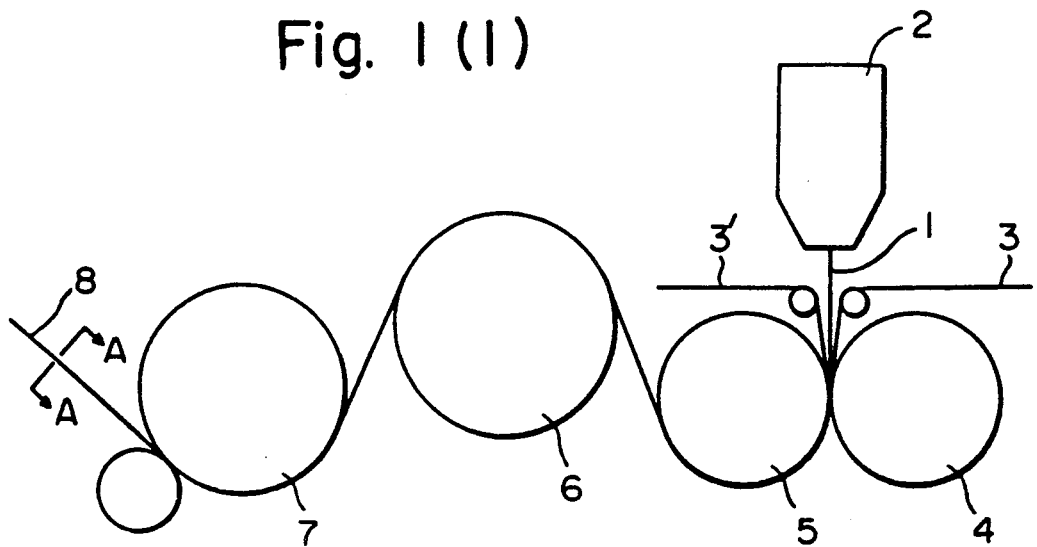
Fig. 1 (2)
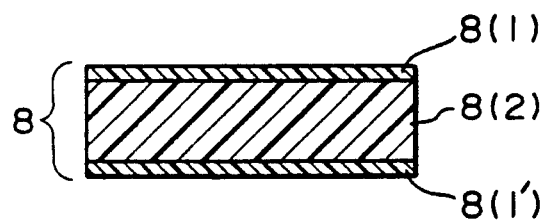
Fig. 2
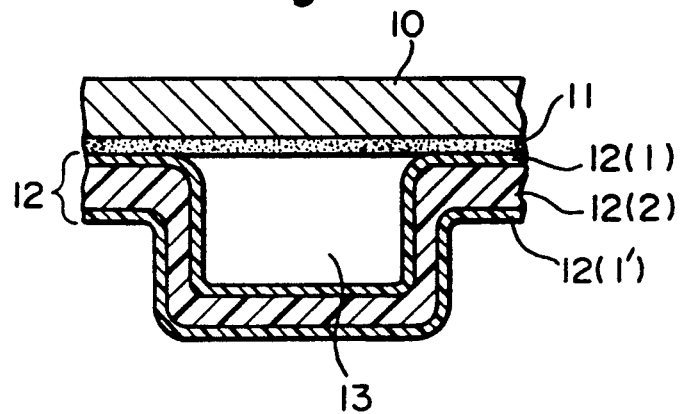

PACKAGING STRUCTURE

This application is a continuation of application Ser. No. 07/575,849, filed Aug. 31, 1990, now abandoned; which is a division of application Ser. No. 07/399,391, filed Aug. 25, 1989, now U.S. Pat. No. 4,973,375; which is a continuation of application Ser. No. 07/044,698, filed May 1, 1987, now abandoned.

BACKGROUND OF THE INVENTION

1. Field of the Invention

This invention relates to a packaging structure having excellent moisture resistance and transparency and permits excellent withdrawal of goods packed therein, and to a process for production thereof.

This invention also pertains to a process for producing a composite sheet which can be suitably shaped into a packaging structure by vacuum forming and/or pressure forming.

2. Description of the Prior Art

Pharmaceuticals (in tablets, capsules, etc.), cosmetics and foodstuffs must be completely packed since insufficient packing can readily cause degeneration or spoilage. Furthermore, it is convenient if after packing these goods can be viewed from outside.

In order to meet such a requirement, there have previously been used packages obtained by filling such goods in accordance with vacuum forming and/or pressure forming using a single-layer sheet of polyvinyl chloride (PVC) or polypropylene (PP), or a composite sheet composed of a polyethylene (PE) sheet and PVC layers bonded to both surfaces of the polyethylene sheet by a dry laminating method.

Since a packaging structure formed of a single-layer sheet of PVC or PP has low moisture resistance, it is the usual practice to remedying this defect by putting the packaging structure further in an aluminum bag. But the moisture resistance of the packaging structure after opening the aluminum bag is a problem, and filling of the package into the aluminum bag makes the manufacturing process complex and adds to the cost of production.

A package formed by using a composite sheet composed of PE and PVC has fairly satisfactory moisture resistance in practical use, but the ease of withdrawing the contents from the package is not entirely satisfactory. Some of new drugs recently developed require higher moisture-proof than before, and for packing such drugs, the moisture resistance of packaging structure composed of the aforesaid composite sheet is still desired to be improved.

SUMMARY OF THE INVENTION

This invention relates to a packaging structure having improved moisture resistance over conventional packaging structures, and to an efficient process for production thereof.

The invention also relates to an efficient process for producing a composite sheet suitable as a material for the aforesaid packaging structure.

According to this invention, there is provided a packaging structure composed of a composite synthetic resin sheet having a depressed portion formed therein for holding an article and a metal foil bonded to the sheet, said composite sheet being a three-layer sheet composed of an interlayer of high-density polyethylene and outside layers of a propylene polymer bonded to both surfaces of the interlayer, the interlayer having a thickness of 120 to 800 micrometers, each of the outside layers having a thickness of 15 to 80 micrometers, and the thickness of the interlayer being at least 2.5 times the total thickness of both outside layers.

According to this invention, there is also provided a process for producing a packaging structure composed of a composite synthetic resin sheet having a depressed portion formed therein for holding an article and a metal foil bonded to the sheet, said composite sheet being a three-layer sheet composed of an interlayer of high-density polyethylene and outside layers of a propylene-type polymer bonded to both surfaces of the interlayer, the interlayer having a thickness of 120 to 800 micrometers, each of the outside layers having a thickness of 15 to 80 micrometers, and the thickness of the interlayer being at least 2.5 times the total thickness of both outside layers; said process comprising forming said depressed portion in the composite sheet by vacuum forming and/or pressure forming, and superimposing a metal foil on the composite sheet so that the depressed portion can be sealed up with the metal foil after filling an article therein, and bonding both into a unitary structure between the metal foil and that outside layer of the composite sheet which is on the opening side of said space while applying heat from the side of the metal foil thereby to seal up said space.

According to this invention, there is further provided a process for producing a composite sheet which comprises simultaneously melt-bonding films of a propylene polymer each having a thickness of 15 to 80 microns as outside layers to both surfaces of an melt-bondable interlayer of high-density polyethylene having a thickness of 120 to 800 micrometers which is at least 2.5 times the total thickness of the outside layers.

BRIEF DESCRIPTION OF THE DRAWINGS

FIG. 1 (1) is a simplified view showing an example of apparatus for producing a composite sheet in accordance with this invention;

FIG. 1 (2) is an enlarged cross-sectional view of the composite sheet produced by the apparatus shown in FIG. 1 (1); and FIG. 2 is a sectional view of the principal part of a packaging structure provided in accordance with this invention.

DESCRIPTION OF THE PREFERRED EMBODIMENTS OF THE INVENTION

The packaging structure provided by this invention is obtained by bonding a specific composite synthetic resin sheet having depressed portions formed therein for receiving articles to a metal foil.

The depressed portions for holding articles, known as pockets in the art, are formed in the composite synthetic resin sheet by vacuum forming and/or pressure forming.

The composite synthetic resin sheet used is a three-layer sheet composed of an interlayer of high-density polyethylene as a major component and outside layers of a propylene polymer bonded to both surfaces of the interlayer. The thickness of each of the outside layers is 15 to 80 micrometers. The thickness of the interlayer is 120 to 800 micrometers, and at least 2.5 times the total thickness of the outside layers.

The high-density polyethylene constituting the interlayer preferably has a melt flow rate $MFR_2$ (190° C.) of 2 to 20 and a density of 0.94 to 0.98, preferably 0.965 to 0.98.

The high-density polyethylene of the above properties is preferred in order to improve the strength, transparency and moisture resistance of the packaging structure and obtain rigidity suitable for the ease of withdrawing the contents. Especially preferably, the high-density polyethylene has a melt flow rate ratio, $MFR_{10}$ (190° C.)/$MFR_2$, of from 1 to 10.

The propylene polymer constituting the outside layers is preferably composed of 60 to 97% by weight of polypropylene and 40 to 3% by weight of an ethylene polymer (total 100% by weight) from the standpoint of adhesion between the interlayer and the metal foil, transparency and strength. The polypropylene, as used herein, denotes a polymer containing at least 90 mole % of propylene units which preferably has a melt flow rate of 0.5 to 20.

The ethylene polymer also has an effect of improving the adhesion of the outside layers to the interlayer. The ethylene polymer, as used herein, denotes a homopolymer of ethylene or a copolymer of 50 to less than 100 mole % of ethylene with at least one other copolymerizable monomer, particularly an alpha-olefin. The ethylene polymer thus includes, for example, low-crystalline or amorphous (rubbery) polymers such as ethylene/propylene copolymer and ethylene/butene copolymer, high-density polyethylene, medium-density polyethylene, low-density polyethylene, and crystalline copolymers of ethylene with other alpha-olefins.

Preferred examples of the ethylene polymer are shown below.

(i) Low-crystalline or amorphous copolymer (rubber) of ethylene and propylene having an ethylene unit content of 50 to 90 mole % and an $MFR_2$ (230° C.) of 0.1 to 20 g/10 min.

(ii) Low-crystalline or amorphous copolymer (rubber) of ethylene and 1-butene having an ethylene unit content of 50 to 90 mole % and an $MFR_2$ (230° C.) of 0.1 to 20 g/10 min.

(iii) Crystalline polyethylene having an $MFR_2$ (190° C.) of 2 to 20 g/10 min. and a density of 0.900 to 0.975 g/cm$^3$.

(iv) High-density, medium-density or low-density crystalline copolymers of ethylene with at least one other alpha-olefin having an $MFR_2$ (190° C.) of 2 to 20 g/10 min. and a density of 0.900 to 0.975 g/cm$^3$.

Comonomers: alpha-olefins having 3 to 20 carbon atoms such as propylene, 1-butene, 1-pentene, 1-hexene, 4-methyl-1-pentene, 1-octene and 1-decene.

Comonmer content: 0 to 20 mole %.

The polymers or copolymers (i) to (iv) may be modified partly or wholly with unsaturated carboxylic acids or anhydrides thereof. Preferred unsaturated carboxylic acids and anhydrides thereof are maleic acid, norbornenedicarboxylic acid, acrylic acid, methacrylic acid, maleic and norbornenedicarboxylic anhydride.

The radio of polypropylene to ethylene polymer in the outside layer should preferably be within the above-specified range in order to secure good adhesion between the interlayer and the outside layer.

Because of the above preferred polymer ratio of the outside layer, the adhesion strength between the interlayer and the outside layer of the composite sheet used in this invention is preferably at least 300 g/cm, more preferably at least 500 g/cm.

The thickness of the composite sheet is usually 150 to 960 micrometers. The interlayer has a thickness of 120 to 800 micrometers. Each of the outside layers has a thickness of 15 to 80 microns. The thickness of the interlayer is at least 2.5 times the total thickness of the outside layers.

The interlayer should have a sufficient thickness as a base layer of the composite sheet. The outside layers are provided in order to make up for low vacuum and pressure formability and stretchability of the high-density polyethylene constituting the interlayer. If the above-specified thicknesses of the sheet layers fall outside the ranges specified above, sufficient results cannot be obtained with regard to moisture resistance and the ease of withdrawing the contents.

The composite sheet of the above structure can be produced by various methods, for example, by dry lamination of pre-shaped outside layers to a pre-shaped interlayer via an adhesive such as an urethane-type adhesive in the interfaces.

Preferably, the composite sheet constituting the packaging structure of this invention can be efficiently produced by an "extrusion-simultaneous both surface bonding method" which comprises melt-extruding the interlayer between two pre-shaped outside layers, and simultaneously pressing the entire structure with rolls from both sides. This method can efficiently give a uniform composite sheet.

One example of the extrusion-simultaneous both surface bonding method is shown in FIG. 1 (1). High-density polyethylene as an interlayer 1 flows in the molten state from a die 2 onto a point near a press-contact point between a first roll 5 and a press roll 4, preferably onto the press-contact point. Propylene polymer films 3 and 3' as outside layers adhere to both surfaces of the polyethylene at this press-contact point and drawn via second roll 6 and a third roll 7 to form a composite sheet 8. FIG. 1 (2) shows a sectional view of the resulting composite sheet 8 taken along line A—A of FIG. 1 (1). The composite sheet is composed of outside layers of propylene polymer films 8(1) and 8(1'), and an interlayer of polyethylene sheet 8(2).

Melt-bonding of the outside propylene polymer film and the interlayer polyethylene sheet is carried out by utilizing the melting temperature of the polyethylene immediately after extrusion which is about 170° C. Intrinsically, polypropylene and polyethylene are difficult to melt-bond to each other. However, since the propylene polymer constituting the outside layer has the specific composition described above, they have good adhesion to each other to give a composite sheet having excellent transparency.

The packaging structure of this invention can be obtained, for example, by subjecting the aforesaid three-layer composite sheet to pressure forming and/or vacuum forming to form depressed portions and sealing up the depressed portions by bonding a metal foil to the composite sheet to produce a unitary structure.

The metal foil may be foils of various metals such as aluminum, and has a thickness of usually 10 to 100 micrometers, preferably 15 to 60 micrometers.

When the packaging structure is to be used in press through packaging applications (known as PTP), an aluminum foil is preferred as the metal foil since it can be broken by pressing with a proper force. At least that side of the metal foil which is to be bonded to the composite sheet is preferably coated with an adhesion improving substance such as an adhesive polyolefin. An example of the adhesive polyolefin is a halogenated polyolefin obtained by modifying a polyolefin such as polypropylene with a halogen such as chlorine.

Specifically, a long-strip of the composite sheet is continuously heated to a moldable condition and subjected to air pressurization and/or vacuum suction in a mold to form depressed portions. An article, for example a drug in capsule form, is filled in the resulting depressed portions, and a metal foil such as an aluminum foil is bonded to the composite sheet on the side of the depressed portions. The resulting package is subsequently subjected to punching, perforation, printing, etc. The propylene polymer used in this invention has poor pressure formability or vacuum formability, but its pressure formability and vacuum formability are improved by the bonding of the propylene polymer films as outside layers and by orientation at the time of forming the composite sheet. The moisture resistance and transparency of the package are also improved.

The above pressure forming and/or vacuum forming is carried out usually at a temperature of 120° to 140° C., preferably 125° C. to 135° C. The degree of orientation of the composite sheet can be varied by the heating temperature during pressure forming and/or vacuum forming. Since pressure forming and/or vacuum forming at low temperatures is possible in this invention, the resulting packaging structure has further improved moisture resistance and transparency.

One example of the packaging structure of this invention is shown in FIG. 2. An aluminum foil 10 is coated with a substance 11 adhesive to polyolefin. A composite sheet 12 is bonded to the aluminum foil 10 after depressed portions 13 are formed in it by pressure forming and/or vacuum forming. The composite sheet 12 is composed of propylene polymer films 12(1) and 12(1') as outside layers and an interlayer of polyethylene sheet 12(2). An article such as a drug, cosmetic or food is received in the depressed portion 13.

The packaging structure of this invention is especially suitable for press through packaging applications and is used for packing tablets, capsules, and other articles.

The following examples illustrate the present invention more specifically.

EXAMPLES 1-8

In each run, a three-layer composite sheet having the composition shown in Table 1 was formed by the extrusion-simultaneous both surface bonding method shown in FIG. 1(1).

High-density polyethylene (HDPE) used as an interlayer had an $MFR_2$ (190° C.) of 5.5 g/10 min., a density of 0.968 g/cc, a weight average molecular weight of 67,000 and an $MFR_{10}/MFR_2$ ratio of 9.0.

The propylene polymer used in an outside layer has the polymer composition shown in Table 1, and the properties of the individual components were as follows:

PP: polypropylene having an $MFR_2$ (230° C.) of 6.0 g/10 min. and an ethylene content of 4 mole %.

EPR: ethylene/propylene copolymer rubber having an ethylene unit content of 80 mole % and an $MFR_2$ (230° C.) of 2 g/10 min.

LLDPE (1): ethylene/4-methyl-1-pentene copolymer having an ethylene unit content of 97 mole % and an $MFR_2$ (190° C.) of 2.0 g/10 min.

LLDPE (2): ethylene/1-butene copolymer having an ethylene unit content of 97.5 mole % and an $MFR_2$ (190° C.) of 2.0 g/10 min.

LDPE: low-density polyethylene having a density of 0.921 g/cc and a weight average molecular weight of 112,000.

Depressed portion or pockets (each having a length of 20.6 mm, a width of 8.8 mm and a depth of 7.4 mm for holding No. 2 capsules for pharmaceutical use) were formed in the composite sheet by vacuum forming and pressure forming at low temperatures (125° to 128° C.) and high temperatures (130° to 135° C.), and then the composite sheet was bonded to an aluminum foil to produce a unitary packaging structure in accordance with this invention.

The aluminum foil had a thickness of 20 microns and bore a 6 micron-thick chlorinated polypropylene coating on that surface which was bonded to the composite sheet.

The properties of the resulting packaging structure were measured and evaluated by the following methods, and the result are shown in Table 2.

DD (drawdown property, mm)

A sample of the composite sheet was held horizontally between clamps with a span of 500 mm. The amount (mm) of lowering of its central part after 55 seconds was measured.

Moisture permeability
($\times 10^{-6}$ g/24 hr/mmHg/pocket)

Measured in accordance with JIS Z-0203 under condition B (i.e., at a temperature of 40° C. and a relative humidity of 90%). The size of one pocket is that of a depressed portion for a No. 2 capsule.

Transparency (in terms of percent transmittance)

The transmittance (%) of the bottom of the pocket (depressed portion) of the packaging structure was measured using light having a wavelength of 555 micrometers in accordance with ASTM D1003.

Ease of withdrawing the contents

The bottom of the pocket of the packaging structure holding a pharmaceutical capsule therein was pressed to collapse by a finger from the side of the composite sheet, and thus the capsule in the pocket was caused to press and break the aluminum foil. By this operation, the capsule was taken out from the pocket. It was determined whether the rigidity and flexural strength of the composite sheet were suitable at the time of collapsing the pocket with the finger.

The symbols ○, Δ and × have the following meanings.

○: excellent; Δ: good; ×: bad

EXAMPLE 9

A composite sheet having the composition shown in Table 1 was produced by dry lamination.

Specifically, films of polypropylene (shown above as PP) having a thickness of 30 micrometers were laminated to both surfaces of a pre-shaped sheet of HDPE having a thickness of 450 micrometers through a polyurethane-type adhesive to form a composite sheet.

The composite sheet was subjected to the same pressure forming and vacuum forming as in Example 1 to produce a packaging structure. The properties of the packaging structure were measured, and the results are shown in Table 2.

COMPARATIVE EXAMPLE 1

Example 9 was repeated except that polyvinyl chloride (PVC) films were used as the two outside layers. The results are shown in Table 2.

TABLE 1

| Example | Thickness of the interlayer (micrometers) | Outside layers | | | | | | Thickness of each outside layer (micrometers) | Thickness of the entire composite sheet (micrometers) |
|---|---|---|---|---|---|---|---|---|---|
| | | Composition of polymers | | | | | | | |
| | | Type | Proportion (wt. %) | Type | Proportion (wt. %) | Type | Proportion (wt. %) | | |
| 1 | 310 | PP | 70 | LDPE | 20 | EPR | 10 | 30 | 370 |
| 2 | 450 | PP | 70 | LDPE | 20 | EPR | 10 | 30 | 510 |
| 3 | " | PP | 90 | LLDPE(1) | 10 | — | — | 30 | 510 |
| 4 | " | PP | 80 | LLDPE(1) | 20 | — | — | 30 | 510 |
| 5 | " | PP | 80 | LLDPE(2) | 20 | — | — | 30 | 510 |
| 6 | " | PP | 70 | LDPE | 30 | — | — | 30 | 510 |
| 7 | " | PP | 85 | LLDPE(1) | 15 | — | — | 30 | 510 |
| 8 | " | PP | 75 | LLDPE(1) | 20 | EPR | 5 | 30 | 510 |
| 9 | " | PP | 100 | — | — | — | — | 30 | 510 |
| Comparative Example 1 | " | PVC | 100 | — | — | — | — | 30 | 510 |

TABLE 2

| Example | Pressure formability and vacuum formability | | | | Moisture Permeability | | Transparency | | Ease of withdrawing the contents |
|---|---|---|---|---|---|---|---|---|---|
| | Low temperature conditions (125–128° C.) | | High temperature conditions (130–135° C.) | | Molded under the low temperature conditions | Molded under the high temperature conditions | Molded under the low temperature conditions | Molded under the high temperature conditions | |
| | Overall evaluation | DD | Overall evaluation | DD | | | | | |
| 1 | ○ | 20 | ○ | 15 | 5.0 | 8.0 | | | ○ |
| 2 | ○ | 25 | ○ | 15 | 4.5 | 7.5 | 81 | 79 | ○ |
| 3 | ○ | 30 | ○ | 25 | 4.5 | 7.0 | | | ○ |
| 4 | ○ | 30 | ○ | 25 | 4.5 | 7.0 | | | ○ |
| 5 | ○ | 30 | ○ | 25 | 4.5 | 7.0 | | | ○ |
| 6 | ○ | 25 | ○ | 15 | 4.5 | 7.0 | | | ○ |
| 7 | ○ | 30 | ○ | 20 | 4.5 | 7.0 | | | ○ |
| 8 | ○ | 25 | ○ | 20 | 4.5 | 7.5 | | | ○ |
| 9 | ○ | 30 | ○ | 20 | 5.5 | 8.0 | 80 | 73 | ○ |
| Comparative Example 1 | ○ | 10 | ○ | 5 | 7.9 | 13.2 | 73 | 70 | X |

EXAMPLES 10–14

In each run, Example 1 was repeated except that the thicknesses of the interlayer and the outside layers were changed as shown in Table 3. The resulting packaging structure was evaluated as in Example 1. The results are shown in Table 4.

TABLE 3

| | Thickness (micrometers) | | |
|---|---|---|---|
| Example | Interlayer | Outside layer | Thickness of the entire composite sheet |
| 10 | 160 | 30 | 220 |
| 11 | 140 | 20 | 180 |
| 12 | 310 | 20 | 350 |
| 13 | 400 | 70 | 540 |
| 14 | 600 | 60 | 720 |

TABLE 4

| Example | Presure and vacuum formability under low temperature conditions (123–128° C.) | | Moisture permeability of the packaging structure formed under low temperature conditions | Ease of withdrawing the contents |
|---|---|---|---|---|
| | Overall evaluation | DD | | |
| 10 | ○ | 15 | 7.0 | ○ |
| 11 | ○ | 15 | 7.5 | ○ |
| 12 | ○ | 25 | 5.0 | ○ |
| 13 | ○ | 20 | 4.5 | ○ |
| 14 | ○ | 25 | 3.0 | Δ |

What is claimed is:

1. A packaging structure composed of a composite synthetic resin sheet having a depressed portion formed therein for holding an article and a metal foil bonded to the sheet, said composite sheet being a three-layer sheet composed of an interlayer of high-density polyethylene and outside layers of a propylene polymer bonded to both surfaces of the interlayer, the interlayer having a thickness of 120 to 800 micrometers, each of the outside layers having a thickness of 15 to 80 micrometers, and the thickness of the interlayer being at least 2.5 times the total thickness of both outside layers.

2. The packaging structure of claim 1 wherein the propylene polymer constituting the outside layers is composed of 60 to 97% by weight of polypropylene and 40 to 3% by weight of an ethylene polymer, the total proportion being 100% by weight.

3. The packaging structure of claim 2 wherein the polypropylene is a polymer containing at least 90 mole % of propylene units and having an MFR$_2$ (230° C.) of 0.5 to 20, and the ethylene polymer is a homopolymer of ethylene or a copolymer of ethylene with at least one other alpha-olefin each containing 50 to 100 mole % of ethylene units.

4. The packaging structure of claim 1 wherein the high-density polyethylene constituting the interlayer of the composite sheet has an $MFR_2$ (190° C.) of 2 to 20 and a density of 0.94 to 0.98 g/cc.

5. The packaging structure of claim 4 wherein the high-density polyethylene has an $MFR_{10}$ (190° C.)/$MFR_2$ (190° C.) ratio of 1 to 10.

6. A packaging structure composed of a composite synthetic resin sheet having a depressed portion pocket formed therein for holding an article and a metal foil bonded to the sheet, said composite sheet being a three-layer sheet composed of an interlayer of high-density polyethylene and outside layers of a propylene polymer bonded to both surfaces of the interlayer, the interlayer of polyethylene is composed of 50 to 100 mole % ethylene and the outside propylene polymer layers are composed of 60 to 97% by weight of polypropylene and 40 to 3% by weight of ethylene polymer, the interlayer having a thickness of 120 to 800 micrometers, each of the outside layers having a thickness of 15 to 80 micrometers, and the thickness of the interlayer being at least 2.5 times the total thickness of both outside layers.

7. The packaging structure of claim 6 wherein the polypropylene is a polymer containing at least 90 mole % propylene units and having an $MFR_2$ (230° C.) of 0.5 to 20, and the ethylene polymer is a homopolymer of ethylene or a copolymer of ethylene with at least one other alpha-olefin, each containing at least 50 mole % of ethylene units.

8. The packaging structure of claim 6 wherein the high-density polyethylene constituting the interlayer of the composite sheet has an $MFR_2$ (190° C.) of 2 to 20 and a density of 0.94 to 0.98 g/cc.

9. The packaging structure of claim 8 wherein the high-density polyethylene has an $MFR_{10}$ (190° C.)/$MFR_2$ (190° C.) ratio of 1 to 10.

* * * * *